United States Patent [19]

Gechter et al.

[11] Patent Number: 5,036,535
[45] Date of Patent: Jul. 30, 1991

[54] SWITCHLESS AUTOMATIC CALL DISTRIBUTION SYSTEM

[75] Inventors: Jerry Gechter, Lincoln; Jeffrey A. Fried, Somerville; Robert L. Pokress, Andover, all of Mass.

[73] Assignee: UNIFI Communications Corporation, Billerica, Mass.

[21] Appl. No.: 441,945

[22] Filed: Nov. 27, 1989

[51] Int. Cl.$^5$ .............................................. H04M 3/42
[52] U.S. Cl. .................................... 379/210; 379/100; 379/265; 379/221; 379/201
[58] Field of Search ............... 379/207, 201, 265, 266, 379/309, 220, 221, 210, 211, 212, 213, 214, 224

[56] References Cited

U.S. PATENT DOCUMENTS

| | | |
|---|---|---|
| 4,191,860 | 3/1980 | Weber . |
| 4,348,554 | 9/1982 | Asmuth . |
| 4,653,085 | 3/1987 | Chan et al. . |
| 4,696,028 | 9/1987 | Morganstein et al. . |
| 4,737,983 | 4/1988 | Frauenthal et al. . |
| 4,757,267 | 7/1988 | Riskin . |
| 4,757,526 | 7/1988 | Foster et al. . |
| 4,763,353 | 8/1988 | Canale et al. . |
| 4,788,718 | 11/1988 | McNabb et al. . |
| 4,837,799 | 6/1989 | Prohs et al. .......................... 379/224 |

OTHER PUBLICATIONS

American National Standard for Telecommunications in Call Transfer Service, T1S1.1 88-403.
American National Standard for Telecommunications in Call Forwarding Unconditional (T1S1.1 88-234).
American National Standard for Telecomunications in Call Forwarding Busy (T1S1.1 88-235).
American National Standard for Telecommunications in Call Forwarding No Reply (T1S1.1 88-236).
Infoswitch product brochure
Microvoice Apex Fact Sheets.
Aspect Call Center product brochure.

*Primary Examiner*—James L. Dwyer
*Attorney, Agent, or Firm*—Fish & Richardson

[57] ABSTRACT

An automatic call distributing system for automatically distributing telephone calls placed over a network to one of a plurality of agent stations connected the network via network service interfaces and providing agent status messages to the network, the system including receiving means connected via a network service interface to the network for receiving the agent status messages and a call arrival message from the network indicating that an incoming call has been made on the network, and routing means responsive to the receiving means for generating a routing signal provided to the network to connect the incoming call to an agent station through the network. Also disclosed are handling transitions of agent stations using transition notifications, transition requests and forced response signals; and rerouting of telephone calls using incoming call notification signals, response signals, pre-notification signals, and calling line identification of the incoming call.

63 Claims, 7 Drawing Sheets

No Access to Wrapup

States and Transitions from Fig. 4

SWITCHLESS AUTOMATIC CALL DISTRIBUTION SYSTEM

BACKGROUND OF THE INVENTION

The invention relates to automatic call distributing systems for automatically distributing incoming telephone calls to one of a plurality of agent stations.

An automatic call distributor (ACD) is a call management system that efficiently routes calls, such as toll-free "800" calls, to agents in telemarketing and service inquiry centers and provides specialized real-time call management and report generation capabilities. An ACD is a unique communications product in that it directly supports the operation and management of a customer's business. The ACD monitors the status of each agent and, when an incoming call is received, selects the agent best able to handle a particular marketing or service request. The ACD also provides detailed reporting on the performance of the agents in their tasks, reporting such statistics as the number of calls handled and the time spent in various stages of call handling.

There are generally two types of ACDs. The first type employs customer premises switching hardware to make connection between the incoming telephone calls and the agents handling the calls. The switching hardware has associated with it substantial initial cost and ongoing maintenance activities and expense. Examples of the first type are systems that are commercially available from Teknekron Infoswitch Corp., DFW Airport, Tex. and Aspect TeleCommunications, San Jose, Calif.

The second type of ACD is implemented as services provided by central office systems (e.g., Centrex ACD available from N.Y. Telephone). These services provide greater freedom in agent location and relief from hardware maintenance but at the cost of reduced functionality and reduced customer control.

SUMMARY OF THE INVENTION

In one aspect, the invention features in general an automatic call distributing system for automatically distributing telephone calls placed over a network to agent stations connected to the network by network service interfaces. The system includes a receiving means that is connected to the network by a network service interface and receives agent status messages and a call arrival message from the network indicating that an incoming call has been made on the network. It also includes a routing means that is responsive to the receiving means to generate a routing signal that is provided to the network to connect the incoming call to an agent station through the network. In this manner, the automatic call distributing system has great flexibility in locating agents, so long as they are connected to the network, and in deciding which agent an incoming call should be routed to. At the same time, the system employs the switching hardware of the network to actually perform the switching function, thereby avoiding costs and maintenance associated with the switching hardware. In addition, the system permits the system operator to maintain control of routing and any data associated with routing by the system operator. This leads to flexibility in monitoring and reporting agent activity for management purposes.

In preferred embodiments, the routing signal is based on status signals received from the agent stations, and can also be based on the characteristics of the agent stations (e.g., capabilities, identities of agents at the stations, or locations of the agent stations) or on the characteristics of the incoming telephone call (e.g., the telephone number dialed, the dialing telephone number of the incoming call or the geographic location of the incoming call) so as to connect the incoming call to the appropriate agent station. The routing signal causes the network to establish a telephone connection from the routing means to the agent station and to thereafter have the network connect the incoming call and the telephone connection to the agent station. The network can be a public or private telephone network. The network service interface is an integrated services digital network interface, and the status messages are provided according to the X.25 standard. The agent station can be implemented by a personal computer or workstation or can be implemented by a device having the dedicated function of control of communication via the network service interface. The agent stations have a plurality of agent states associated with a sign-off condition in which the agent stations do not transmit agent status messages to the routing means and a plurality of states associated with a sign-on condition during which the agent stations do provide the agent status messages to the routing means. The agent stations can initiate outgoing calls in a sign-off condition. In the sign-on condition the agent station can provide a call initiating signal to the routing means, and the routing means thereafter selects a destination telephone number for the agent station. The agent station can include an automated agent or it can include an interactive display terminal for interaction with a human agent. An external host processor containing information as to the business supported by the automatic call distributing system is connected to provide information to and to receive information from the routing means and the agent stations. A system manager station is connected to receive information as to the operation of the automatic call distributing system from the routing means and to provide control signals to the routing means, the control signals including signals for programming the generation of the routing signal by the routing means. An agent supervisor station is connected to receive agent performance information and to provide control signals to the routing means, the control signals relating to the support of the supervised agent activities.

In another aspect, the invention features, in general, an automatic call distributing system including a plurality of agent stations and a call router device for directing incoming telephone calls to the agent stations. The agent stations have a plurality of agent states associated with their operation and provide agent state status messages including state transition notifications and state transition requests, and are responsive to forced response signals that force transitions in agent states. The call router device includes an agent station state manager that is connected to receive the transition notifications and transition requests from the agent stations and to provide forced response signals to the agent stations.

In preferred embodiments, the agent stations include means to wait for a forced response signal from the state manager before changing state when a transition request has been sent. The agent stations have an active state in which the incoming calls are connected, a ready state in which the agent station is ready to receive an incoming call, and one or more other states in which the agent station is not ready to receive an incoming call.

The use of transition requests and forced responses avoids the possibility that an agent may initiate a transition out of the ready state after the call router device has assigned a call to it but prior to delivery of the call. The agent stations also include a set-up state in which the agent station can initiate an outgoing telephone call and an idle state. The agent station has one or more input devices to initiate state transitions and a programmable transition table determining which transitions involve transition notifications, which involve transition requests and which are errors. The call router device has a programmable response table indicating what forced response signals apply to what transition requests.

In another aspect, the invention features in general an automatic call distributing system in which a call router device is able to programmably change the availability of agent states at agent stations as a function of the number of incoming calls placed to the automatic call distributing system.

In other aspects, the invention features, in general, enhanced procedures for automatically rerouting an incoming call placed over a network. In one aspect an incoming call notification signal is sent from a call receiver device to a call destination device, and the call destination device sends a response signal to the call receiver device after receiving the notification signal, thus providing backward communication. In another aspect, the call receiver device provides a pre-notification signal indicating the nature of the incoming telephone call prior to directing the incoming call to the destination device. In another aspect, the call receiver device receives a calling line identification signal, and the calling line identification is used in determining which of the plurality of destination devices the incoming call should be sent to. In preferred embodiments, the incoming call is not directed to the destination device until answering of a call at the destination device, and a tone is provided at the call receiver device which is removed when the incoming call is connected to the destination device. The destination device will not respond to incoming calls that have not been directed to it by the call receiving device when in a signed-on condition. In another aspect, the invention features in general, a system for automatically establishing a communication connection over a network between a service requesting station and one of a plurality of agent service providing stations that are connected to the network via network service interfaces and provide agent status messages to the network. The system includes a receiving means that is connected to the network by a network service interface and receives agent status messages and a service request message from the network indicating that an incoming service request has been made by a service requesting station on the network. The system also includes a routing means that is responsive to the receiving means to generate a routing signal that is provided to the network to connect the incoming service request to an agent service providing station through the network.

In preferred embodiments, the routing signal is based on the status signals to connect the incoming service request to the appropriate agent service providing station; the network is a public or private telephone or data network; there is communication of voice, image or video signals.

Other advantages and features of the invention will be apparent from the following descriptions of embodiments thereof and from the claims.

DESCRIPTION OF THE PREFERRED EMBODIMENT

Drawings

STRUCTURE

Figure 1:
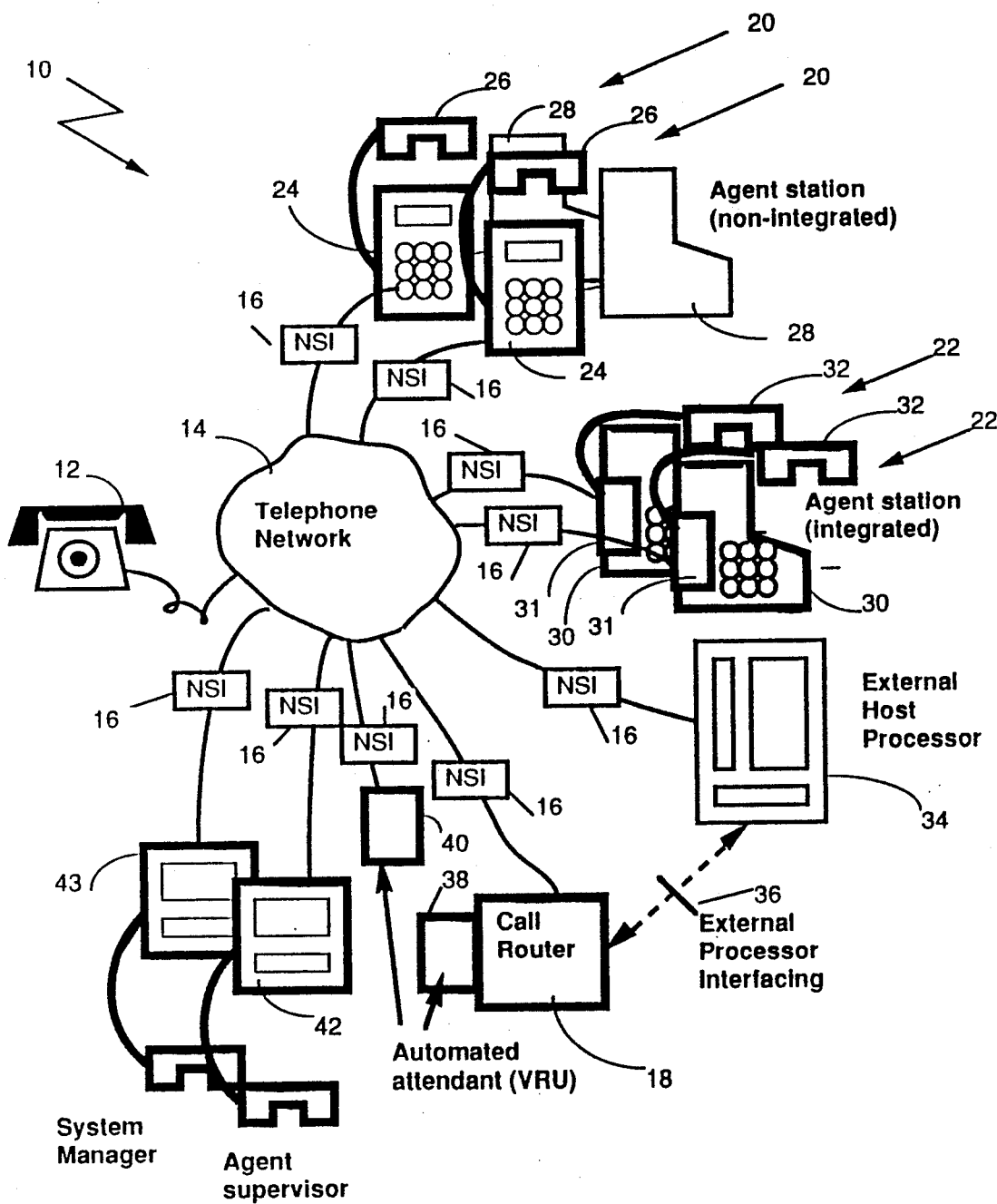
FIG. 1 is a block diagram of a switchless automatic call distributing system according to the invention.

Referring to FIG. 1, there is shown automatic call distributing (ACD) system 10 for distributing incoming calls, e.g., from caller 12, to agent stations, e.g., stations 20, 22, that are connected to public telephone network 14. Each of the components of ACD system 10 is connected to public telephone network 14 via a network service interface 16, which in the preferred embodiment is an integrated systems digital network (ISDN) interface, as is described in more detail below.

Call router 18 is used to cause network 14 to connect an incoming call from caller 12 to one of a large number of agent stations. Call router 18 selects the agent station based upon information received from the agent stations and other information. Call router 18 also assures that agent and system performance data is collected as needed for management purposes. For outgoing calls, call router 18 is involved as required by the particular ACD application, e.g., to handle queuing in agent-to-agent and agent-to-supervisor communication, or in selecting destinations for telemarketing campaigns or external consultation.

Two implementations for agent stations are shown on FIG. 1: nonintegrated agent station 20 and integrated agent station 22. The nonintegrated station has a separate device 24 for controlling network connections and handset 26 that is separate from personal computer (or workstation) 28 used by the agent to enter business activities (e.g., catalog orders or service calls). In the integrated agent station 22, the agent's personal computer (or workstation) 30 is used to make connections with system 10 and has a card 31 for making the connections and controlling handset 32. Agent stations 20, 22 are used by the agents to interact with system 10 and are controlled by call router 18 via X.25 command messages transmitted over network 14, as is described in detail below.

External host processor 34 contains business databases (e.g., order entry, service schedules) used by the operator of ACD system 10. Host processor 34 can be directly connected to router device 18 by an external processor interface 36 or can be remotely located from call router 18 and connected to it via a network services interface 16. The other components of system 10 are automated attendants 38, 40 (either directly connected to call router 18 at a set of B channels or connected by an interface 16 and telephone network 14), agent supervisor station(s) 42, and system manager station(s) 43. Automated attendant 38 or 40 is a system for mechanized interaction with the caller. It can play prompts and receive tone signals from caller 12 used, e.g., by call router 18 in determining which agent to route the incoming call to. In this ISDN ACD embodiment, such devices can appear either as mechanized agent stations with ISDN interfaces (attendant 40 in FIG. 1) or as ISDN B-channel terminations on the router device (attendant 38 in FIG. 1). A voice response unit (VRU) can be employed in place of automated attendant 38 or 40 to play messages in addition to playing prompts and receiving tones. Agent supervisor station 42 provides an interface for the agent supervisor to obtain agent performance information (collected by call router 18). System manager station 43 provides an interface for the system manager to the monitoring, diagnostics and maintenance capabilities of ACD system 10.

In the presently preferred embodiment, ACD system 10 employs the integrated services digital network (ISDN) in order to carry out the switching of calls from an incoming caller 12 to one of plurality of agent stations, to receive information on the status of the agent stations 20, 22, and to perform other communication and control functions. Network service interfaces 16 thus employ the ISDN interface to a telecommunications network as defined by international and domestic U.S. standard bodies. The interface supports a combination of circuit-switched and packet-switched information transfers with a separate message-based signalling channel for connection control. There are two major types of ISDN interface: a basic rate interface (BRI) at 144 kb/s and a primary rate interface (PRI) at 1544 kb/s (North America or Japan) or 2048 kb/s (Europe and most other regions). In the BRI, there are two 64 kb/s bearer (B) channels used for voice, data or other digitally encoded messages and a single 16 Kb/s delta (D) channel used to transmit status and other control messages between call router 18 and the other components. In the PRI, there are 23 (US) or 30 (Europe) B channels and one (64 kb/s) D channel. Agent stations 20, 22 typically employ BRIs, and call routers 18 typically employ BRIs in small systems (e.g., less than 50 agent stations) and PRIs in large systems. With these interfaces there is real time simultaneous transmission of control messages to the agent stations over the D channel at the same time that there is normal telephone operation over a B channel and transmission of status messages over a B channel or D channel. Communications between agent stations 20, 22 and host processor 34 could be over a B channel or the D channel, using either circuit-switched or packet-switched communication. Interface characteristics and capabilities are described in W. H. Harman and C. F. Newman, "ISDN Protocols for Connection Control", IEEE Journal on Selected Areas in Communication, Vol. 7, No. 7, September, 1989, and Stallings, W., "Tutorial, Integrated Services Digital Networks (ISDN)", (Second Edition 1988), Library of Congress No. 87-83433, IEEE Catalog No. EH0270-9, and Bocker, P., "ISDN, The Integrated Services Digital Network, Concepts, Methods, Systems" (Springer-Verlag Berlin, Heidelberg 1988), which are hereby incorporated by reference.

Internationally, the ISDN standards are defined by the CCITT I series of recommendations (I.110-I.470). The standards most directly relevant to the invention are 1.430/431 (physical layer), 1.440/441 (link layer), and 1.450/452 (network layer). The call transfer function used in the invention, described in more detail below, can be implemented by proposed standards which have been prepared in the U.S. in domestic standards group T1S1. (See Call Transfer Service, ANSI Standards Group T1S.1, Document T1S1. 89-467, which is hereby incorporated by reference.) Other ISDN call transfer functions that can be employed have been precisely defined for and are employed in commercially available telecommunications vendor products supporting the ISDN interface in the U.S. For example, the commercially available AT&T 5 ESS switching product employs ISDN call transfer, as described in AT&T 5ESS Switch, ISDN Basic Rate Interface Specification, 5E6 Generic Program, Document 5D5-900-321, Part VA, Section 3.2.4, which is hereby incorporated by reference. Agent status and control messages are transmitted according to the X.25 standard, which is an internationally standardized (CCITT) network service interface between data terminal equipment and a packet data network. Support of X.25 terminal equipment over an ISDN network service interface, as employed in the invention, is standardized in CCITT recommendation X.31.

A common basic hardware platform that can be employed for integrated agent station 22, router device 18, agent supervisor station 42 and system manager station 43 is a personal computer or workstation with an ISDN terminal adapter card. For example, the platform can be implemented with an AST model 80386/25 personal computer running Interactive Systems Corporation UNIX (version 386/ix) as a processing platform and a model BP-100C terminal adapter card (from Teleos Communications, Inc. Eatontown, N.J.) with a UNIX driver to provide the ISDN interface. The functional roles for agent station 22, call router 18, agent supervisor station 42 and system manager station 43 are determined by software. The displays for the personal computers or workstations at stations 22, 42 and 43 and router 18 can use OSF/Motif as a basis for a user interface. (A less expensive integrated agent station 22 may be based on IBM XT-Class or AT-Class personal computers, but in this case, the agent software must run on MS/DOS and not UNIX.) Nonintegrated, low-price, agent station 20 can employ ISDN integrated circuits from Advanced Micro Devices, Sunnyvale, Calif. and be programmed as a stand alone application. Other computers (e.g., mainframes or minicomputers) with ISDN interfaces can also be used for call router 18. A fault tolerant computer available from Stratus or Tandem Computer would be advantageous in providing performance (particularly in large systems) and reliability. Fault tolerant computers provide for continued operation despite system hardware and software failures.

Figure 3:
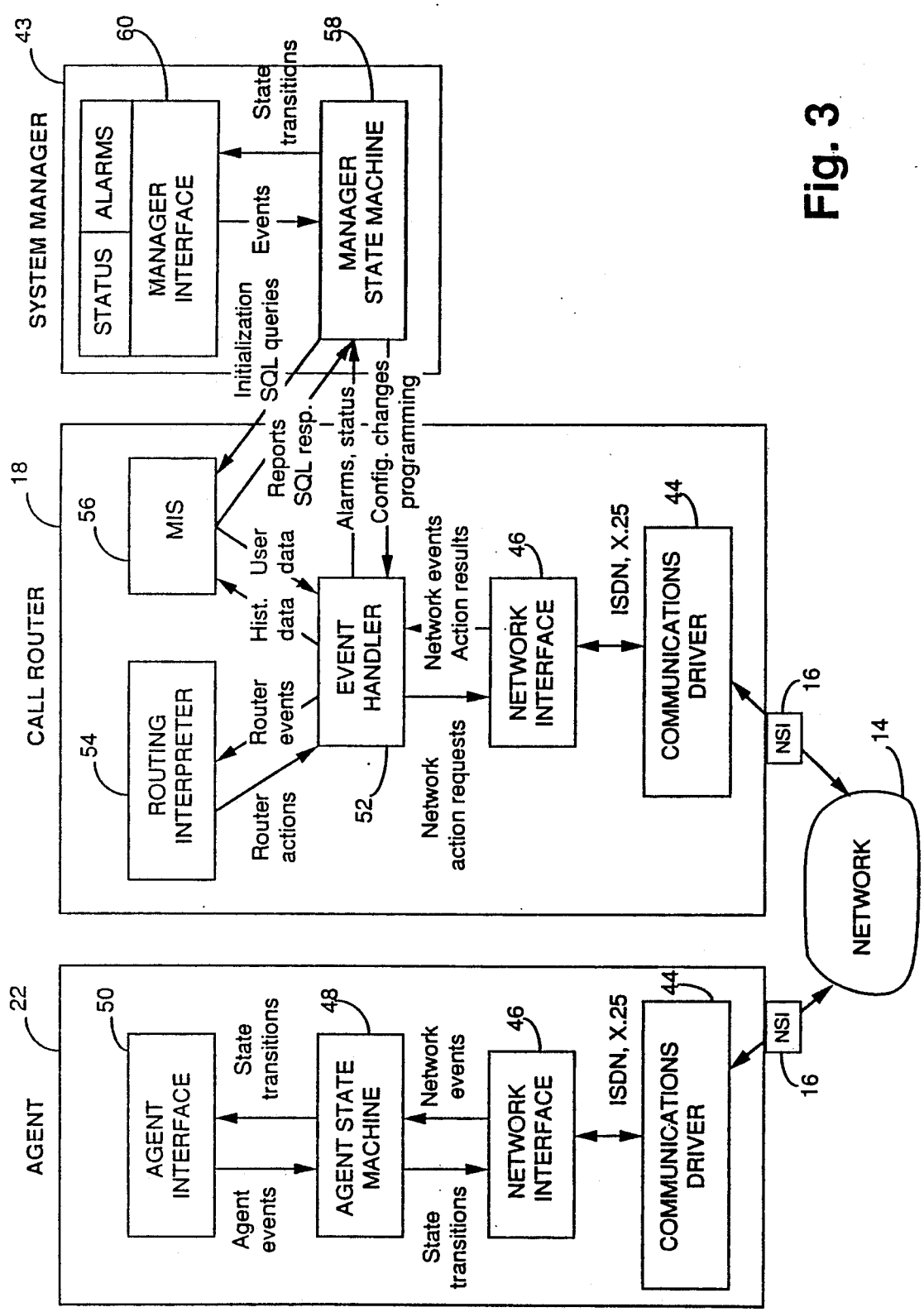
FIG. 3 is a diagram showing the software architecture in the FIG. 1 automatic call distributing system.

Referring to FIG. 3, the software architecture for agent station 22, call router 18, agent supervisor station 42 and system manager station 43 (the last two components are shown in a combined manager/supervisor station 42/43) is shown. Agent station 20 has the same architecture as shown for station 22. In FIG. 3, combined manager/supervisor station 42/43 is shown directly connected to call router 18, contrary to the connection through ISDN interfaces and the telephone network shown for agent supervisor station 42 and system manager station 43 in FIG. 1; either implementation can be employed. The architecture for system manager station 43 is the same as for agent supervisor station 42; in fact, the primary difference between these two stations is the access to different types of data. Agent station 22 is typically connected to the network employing a BRI, and call router 18 can use either a BRI or a PRI.

For both agent station 22 and call router 18, communications driver layer 44 (a UNIX version of the Teleos driver for product BP-100C) translates the messages coming from network 14 to ISDN events and X.25 events. Communications driver layer 44 then interfaces to a network interface layer 46 which translates the ISDN events and X.25 events to and from the events as seen by the actual ACD application.

In agent station 22, the agent application is embodied in agent state machine 48. (The agent states are described in FIG. 4 and the accompanying text.) Inputs to and from the agent are managed by the agent interface subsystem 50, which employs the X-Windows standard in integrated station 22.

In call router 18, network interface 46 feeds event handler 52, which tracks the system state as seen by call router 18 and filters incoming events to notify appropriate subprocesses. Event handler 52 includes a state manager, which is responsible for updating call and agent states associated with any router event in an agent state table. Routing events are processed by routing interpreter 54, which translates user-programmed call routing (depending on the particular ACD application) into a means for selecting which agent station is to receive an incoming call, as is discussed in detail in connection with FIG. 6 below. Actions selected by routing interpreter 54 are executed by event handler 52. In call router 18, network interface layer 46 and communications driver layer 44 act as a receiving means for receiving agent status messages and call arrival messages from network 14, and routing interpreter 53 and event handler 52 act a routing means that is responsive to the receiving means and generates a routing signal (in particular a call transfer request, as is explained below in connection with FIG. 5) to network 14 to connect the incoming call to an agent station.

Management information system (MIS) 56, which employs a relational database (available from Informix Software Inc., Menlo Park, Calif.), handles the historical reporting function of ACD system 10. Historical data including call records and agent results are passed from event handler 52 to MIS system 56, to be stored as tables in the relational database. Reports are prepared as responses to database queries and may be accessed directly by an agent supervisor or system manager.

Event handler 52 queries MIS 56 at user sign-on (at agent stations 20, 22, agent supervisor station 42, or system manager station 43) for password validation and other user data. MIS 56 is initialized by the system manager station 43 at system installation. In subsequent system start up procedures, start up data are extracted by query from permanent storage in the database. Database queries use the Informix version of Structured Query Language (SQL), an evolving standard for relational databases. The agent may also access his own historical performance by database query (not shown for simplicity in FIG. 3).

The system manager at system manager station 43 can configure the ACD system (e.g., assign agents to pools) and program call routing in the ACD, by a program editing and compilation capability of manager state machine 58. A compiled program is entered into the system by invoking appropriate routines in event handler 52; for efficiency the program itself may be sent by a direct link (not shown in the FIG. 3) to routing interpreter 54. Event handler 52 provides manager state machine 58 with alarms and other status information necessary for real-time monitoring of system performance.

Agent supervisor station 42 and system manager station 43 have their own state machines 58 tied to call router 18 and MIS system 56 by local or remote networking. In FIG. 3, for simplicity, the linkage is shown as local, and in FIG. 1 it is shown as remote. If the supervisor or system manager station is remote, then the manager state machine communicates through communications software, a network service interface 16 and network 14 in the linkage to event handler 52 and MIS system 56. Manager interface 60 interactively displays current system status and alarms and provides interactive displays to maintain, diagnose, program, and configure the ACD system.

In a small configuration, call router 18, agent supervisor station 42 and system manager station 43 can share a single processing platform. In larger configurations, the MIS function of call router 18 may have a dedicated processor for improved performance, and the agent supervisor and system manager displays may be off-loaded to individual management stations. Information to be displayed is determined by management identity (i.e., agent supervisor or system manager) as established at sign-on. Also, if an agent supervisor is to be capable of performing also as an agent, then his station will also incorporate the functions of an agent station 22.

Agent stations 20, 22, call router 18, and the other components of ACD system 10 are programmed to provide the agent states, agent selection, call transfer function, and other functions described herein.

Operation

Figure 4:
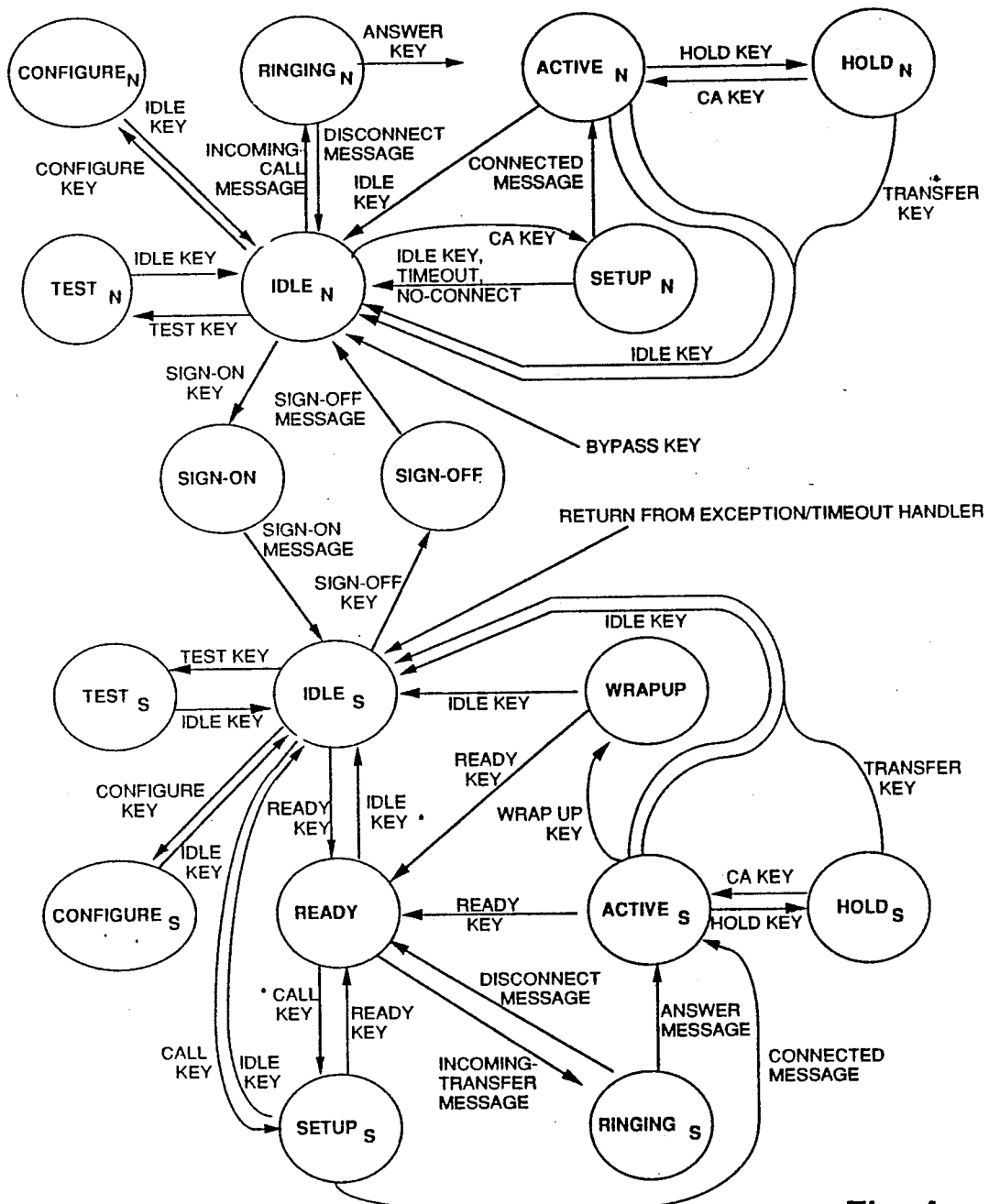
FIG. 4 is a diagram of the agent states and transitions for an agent station of the FIG. 1 system.

Before discussing the typical operation of ACD system 10 in selecting an agent to handle an incoming call and routing the call to that agent, the agent states for the agent stations will be discussed in detail, with reference to the agent state diagram of FIG. 4. The agent station transitions through a number of states which are visible to the agent at the CRT or other interactive display at the agent station and logged at call router 18. Each state involves a change of display screen in at least one window (some states could have more than one screen). A variety of functions could be accessible from within particular states, and would result in an update of the display rather than different screens. The agent can initiate state transitions or function within states by interacting with command keys provided at the interactive display. In FIG. 4, agent states are shown in circles, and keys entered by the agent to initiate state transitions and messages displayed to the agent in going between states are shown adjacent to arrows between states.

The major distinction between two groups of states in FIG. 4 is whether or not the agent is signed on, i.e., identified to ACD system 10 as working; when not in use, the agent station is normally in the IDLE$_N$ state. By pressing the sign-on key, the agent transitions through a SIGN-ON state in which he or she provides identification, password, and any session-dependent parameters to call router 18 and is given authorization to work by receiving a sign-on message. The sign-on procedure establishes an X.25 virtual circuit between each agent station and call router 18, and changes of agent state of significance to call router 18 are communicated to call router 18 by X.25 messages. Similarly, the agent can end her or his work session by pressing the sign-off key from the IDLE$_S$ state. After obtaining approval and providing any necessary session wrap-up information, the agent is give authorization to stop working by receiving a sign-off message. While signed on, any incoming or outgoing calls that the agent may make are considered business calls and are logged at call router 18 and reported to system manager station 43. While signed off, the agent may still initiate or receive calls, such as personal calls, but these are not reported to call router 18; when signed off, call router 18 does not transfer calls to the agent. In the event of a failure at call router 18, the agent may still operate in a "degraded" mode by sending and receiving calls while signed off. By pressing a by-pass key, the agent may transition directly to the IDLE$_N$ state from any other state; this provides a quick escape capability for the case of system failure or other unexpected trouble.

There are five "telephony" states (SETUP, IDLE, HOLD, RINGING and ACTIVE) and two "test" states (TEST and CONFIGURE) which are used in a similar though not identical way when the agent is signed off or signed on. In the state diagram, these are denoted by a subscript 'S' for "signed on" or a subscript 'N' for "not signed on". For example, the TEST$_S$ state provides agent station tests while signed on, and the TEST$_N$ state provides agent station tests while not signed on. These will be different sets of tests (with some overlap), since some hardware-oriented tests should be done only while signed off, and some communications-oriented tests require the assistance of call router 18 (e.g., X.25 loopback between the agent and the router) and therefore should be done while signed on.

While signed on, the agent is in the lower half of the state diagram and can be in the following states.

IDLE$_S$: This state identifies the agent as working, but not willing to receive calls. The agent may use this state for work not related to a specific call or for rest time. The agent is brought into this state after signing on, and can access test and configuration features from this state. An agent may also make outgoing calls or sign-off from the IDLE$_S$ state. In general, transitions into the IDLE$_S$ state are made by pressing the IDLE key.

READY: When in this state, the agent is ready to receive incoming calls. These calls are transferred from call router 18 according to the protocol shown in FIG. 5 and discussed below; the call transfer is referred to as an incoming-call message in the FIG. 4 state diagram. An agent may also make outgoing calls from the READY state by pressing the call key, or make her/himself unavailable for incoming calls by pressing the IDLE key. There is an inherent synchronization issue for any transition out of the READY state; an incoming call could be arriving while the agent is trying to transition into another state. Therefore, the transitions marked with an asterisk (*) in the FIG. 4 state diagram undergo a synchronization protocol discussed below in connection with FIGS. 7A and 7B. If there is an incoming call in process, that call takes priority over the agent making an outgoing call or going idle. This synchronization is fast enough to appear transparent to the agent; ringing will begin, and the button the agent pressed will be ignored. If the incoming caller disconnects, a disconnect message is sent to the agent station, which brings the agent station back to the READY state. While the agent is signed on, incoming calls are accepted by the agent station only if they are authorized by call router 18. Procedures for authorization are discussed in connection with FIG. 5. In general, transitions into the READY state are made by pressing the READY key.

SETUP$_S$: This state is used for making an outgoing call. Digits are collected and parsed by the agent station, to provide speed-dialing and internal number plans. The SETUP$_S$ state is entered by pressing the call key from either the IDLE$_S$ or the READY state.

RINGING$_S$: This state is passed through when receiving an incoming call. The incoming transfer message is provided at the end of the transfer protocol, given in FIG. 5. When transitioning from the READY state to the RINGING$_S$ state, a ringing tone is presented to the agent's headset 26, followed in some applications by a VRU message containing information about the nature of the call (e.g., caller identification, historical information about this customer, type of service request). The agent then answers the call by pressing the answer key; alternatively he/she may be transitioned directly into the ACTIVE$_S$ state via an answer message generated by call router 18. The call is then assigned to a call appearance on the visual display at the agent station. If the incoming caller disconnects, a disconnect message is sent to the agent station, which message brings the agent back to the READY state.

ACTIVE$_S$: Whenever the agent is talking to a customer while signed on, he or she is in this state. Multiple call appearances are handled by placing additional calls on hold, with calls on hold appearing as in the ACTIVE$_S$ state. Transitions out of the ACTIVE$_S$ state are made by pressing either the READY key (taking the agent to the READY state), the IDLE$_S$ key (taking the agent to the IDLE$_S$ state), or the WRAP-UP key (taking the agent to the WRAP-UP state). In all of these cases, the call is terminated if it has not already been terminated by the customer.

HOLD$_S$: In this state, the agent may change to another call appearance in order to consult, transfer or make an outgoing call. An agent may change between call appearances by pressing a call appearance (CA) key, which changes the agent station to the context of that call appearance. Changing context from a call in the Active$_S$ state puts that call appearance into the Hold$_S$ state; pressing the call appearance key corresponding to a call in the Hold$_S$ state will put that call appearance into the Active$_S$ state. Functions such as call transfer require two call legs, one of these being in the Active$_S$ state and the other being in the Hold$_S$ state.

WRAP-UP: In this state, the agent does any work related to a given call which must be done before taking another call, e.g., entering information about the sale or making notations for call-backs.

TEST$_S$: Any tests which can be done while signed on are accessible from this state. Tests can include: communications tests (X.25 loopback, Q.930 and Q.931 tests, link resets), applications tests (interworking with particular applications), VRU tests, non-intrusive agent instrument tests (headset function, memory allocation, some PCTA and CPU diagnostics).

CONFIGURE$_S$: Any configuration parameters which can be set while signed on are accessible in this state. These include:
    password modification set manual or autoconnect call delivery mode
reset agent pool assignment While signed off, the agent is in the upper half of the state diagram and can be in the following states:

IDLE$_N$: This similar to the IDLE$_S$ state in that all tests and calls originate from this state. However, the agent station acts like a conventional telephone set in this state and does not depend upon call router messages for its operation. The agent station also does not send X.25 messages to call router 18 in this state.

SETUP$_N$: This is similar to the SETUP$_S$ state.

RINGING$_N$: This is similar to the RINGING$_S$ state.

ACTIVE$_N$: This is similar to the ACTIVE$_S$ state, including the support of multiple call appearances. The display in this case does not support account information that would be available in the signed-on state.

HOLD$_N$: This is similar to the Hold$_S$ state.

TEST$_N$: Any tests which can be done while signed on are accessible from this state. Tests can include limited communications tests (Q.930 and Q.931 tests, link rests) and agent instrument tests (headset function, memory allocation, PCTA and CPU diagnostics, and powering tests).

CONFIGURE$_N$: Any configuration parameters which can be set while signed on are accessible in this state. These include:

set station ID

Two additional states may optionally be provided in the sign-off condition to achieve full symmetry in signed-on and signed-off states. These are READY$_N$ and WRAPUP$_N$. The state descriptions are similar to those of the READY$_S$ and WRAPUP$_S$ states, but in the signed-off condition, the state transitions are managed by agent state machine 48 in the agent station. There is no synchronization for transitions out of Ready$_N$, since the call router will not be available to handle incoming calls.

Figure 2:
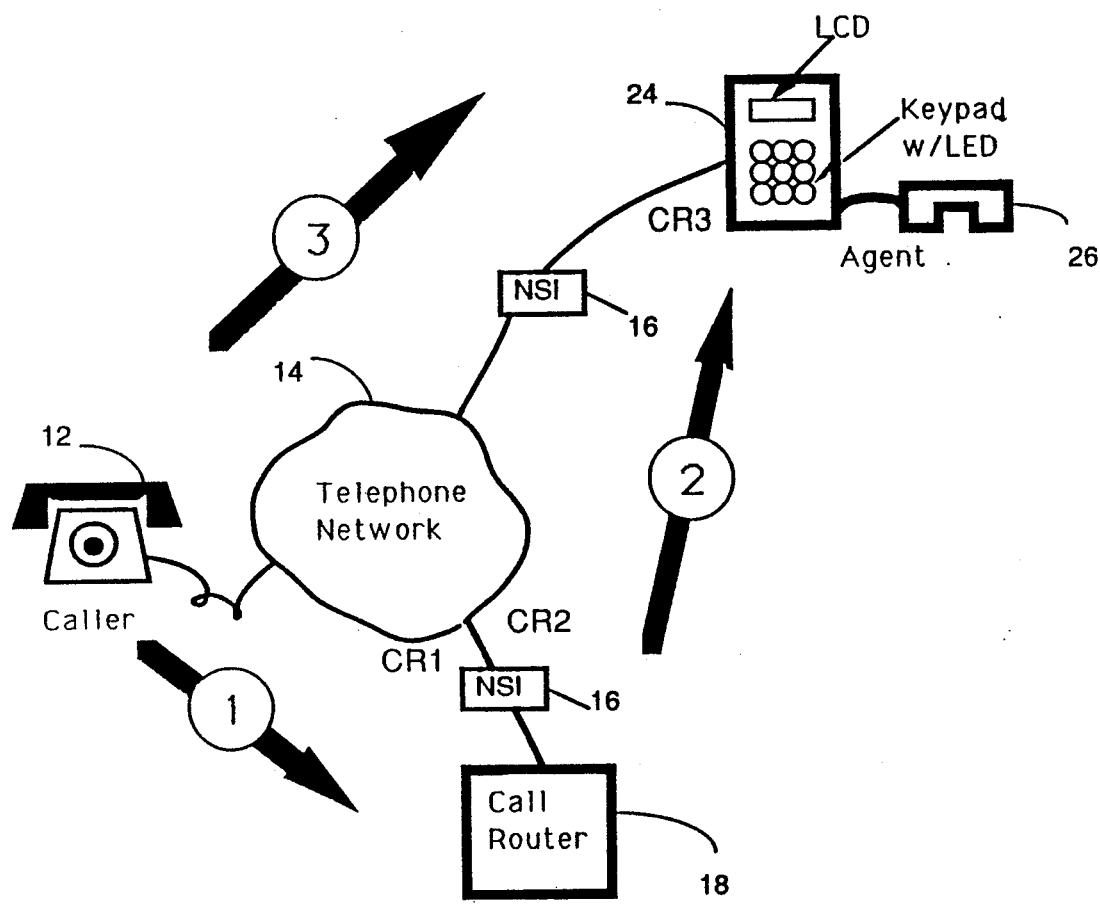
FIG. 2 is a diagram illustrating the handling of an incoming call on the FIG. 1 automatic call distributing system.
Figure 5:
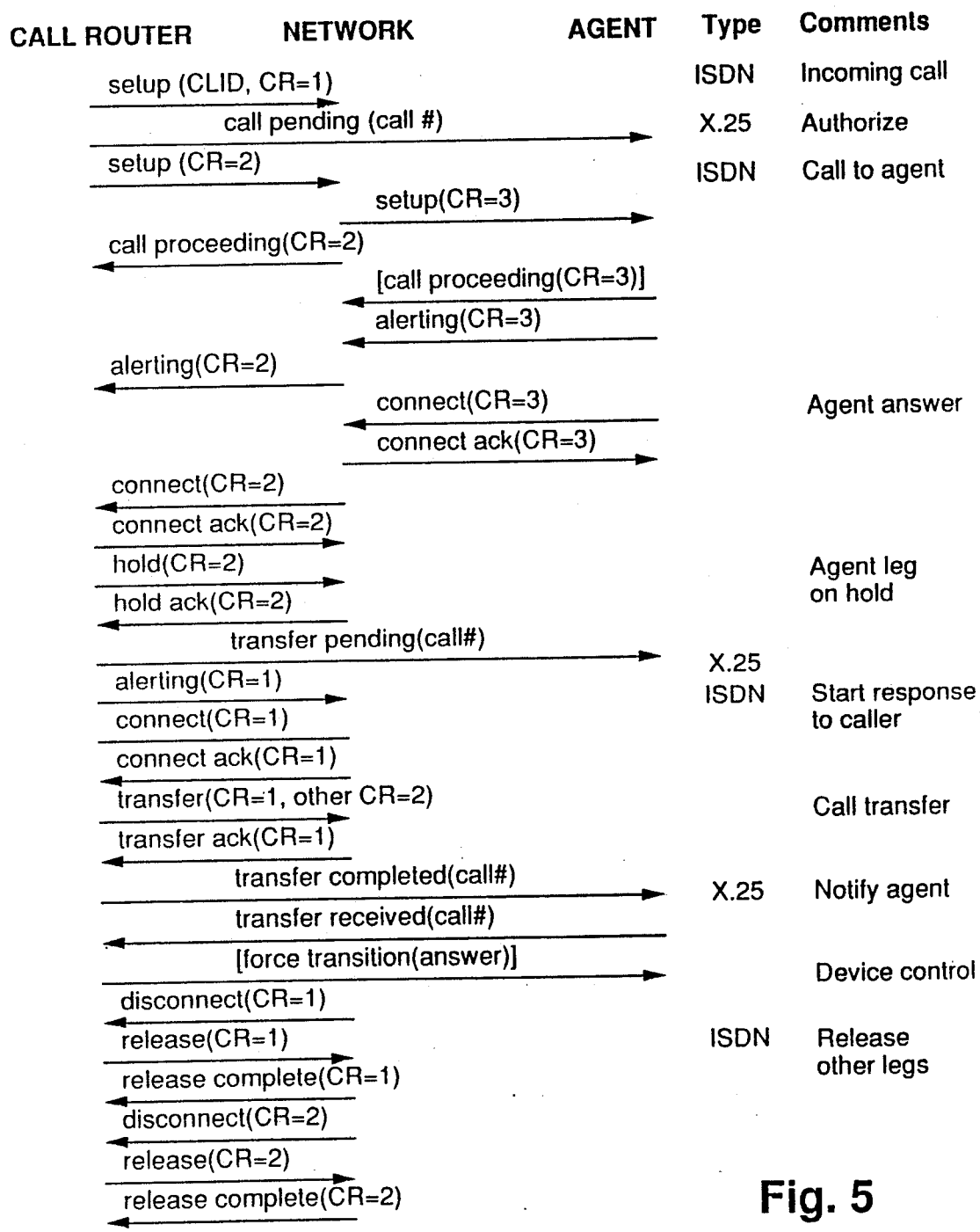
FIG. 5 is a diagram illustrating an example of the protocol for transferring an incoming call to an agent station on the FIG. 1 system.
Figure 6:
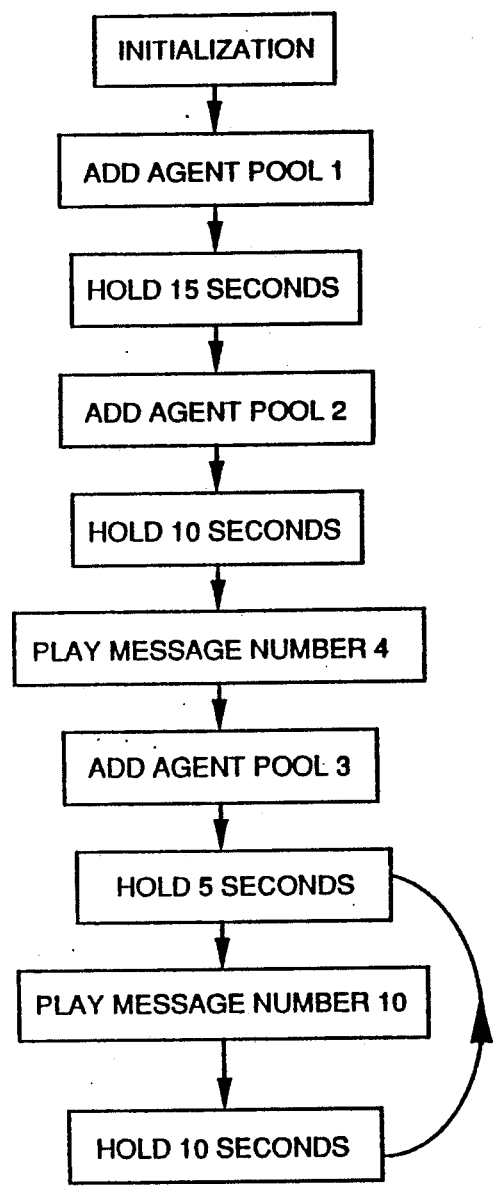
FIG. 6 is a flow chart describing the method employed by a call router of the FIG. 1 system in selecting an agent station to receive an incoming call.

The routing of an incoming call to an agent station is illustrated in FIG. 2; the protocol used in transferring the call from call router 18 to the agent station is shown in FIG. 5, and the decision tree analysis employed in deciding which agent should receive a call is shown in FIG. 6. In general, when an incoming call is made (indicated by "1" in FIG. 2), call router 18 decides which agent station should receive the call, establishes a call with that agent station (indicated by "2" in FIG. 2), and then instructs telephone network 14 to connect the incoming call directly to the agent station (indicated by "3" in FIG. 2) and drops out of the connection.

When an incoming call is made by caller 12 to a telephone number for ACD system 10, network 14 provides a call arrival message to call router 18 indicating that a call has been set up and optionally including the calling line identification (CLID). A call reference number is assigned to this call at the ISDN interface 16 for call router 18, for example, CR=1 (FIGS. 2 and 5).

Call router 18 determines which agent station should receive the call by reference to logic in routing interpreter 54 and data managed by event handler 52. The agent station that is selected is one that is in the READY state (event handler 52 maintains a continuously updated agent state table of the states of signed-on agent stations by X.25 messages); other factors such as agent capabilities, agent identity, agent geographic location, connection cost, service request type, dialed number, caller identity and location can be considered in selecting an agent according to user-programmed routing patterns in routing interpreter 54.

For an incoming call, the initial stage of routing is to determine the particular ACD application (e.g., sales or service) represented by the call, on the basis of dialed number, CLID, incoming trunk (BRI or PRI), and possibly interaction with an automated attendant or VRU. Once the application is known, the remaining routing logic includes a user-programmed sequence of steps such as is shown in FIG. 6. Separate programs can be developed for multiple applications and compiled into logic flows kept in routing interpreter 54.

FIG. 6 shows a logic flow for call handling by call router 18, describing what happens to the call from the moment it enters the system until its processing has been completed. In general, a call is queued before one agent pool while the call goes on hold for 15 seconds. If an available agent has not been identified to answer the call in that time, the call is queued before a second agent group and an announcement is played to the incoming call by VRU 38 or 40. If the call is not answered within a further 10 seconds, it is queued before a third agent group as well. The ACD system 10 then plays an announcement repeatedly (separated by hold periods) until the call is handled. Routing interpreter 54 provides the logic of the call flow shown in FIG. 6. Event handler 52 performs events that are required in each stage in the traversal of the call flow. An advantage of separating these functions is that changes in call flow at different sites or changes in flow made at one site can be implemented solely in routing interpreter 54.

Specifically, referring to FIG. 6, event handler 52 initiates call handling and gives control of the call to routing interpreter 54 for selection of the first routing event. Routing interpreter 54 determines the first action (add the call to Agent Pool 1) and gives control to event handler 52 for execution. If there are agent stations in the READY state, event handler 52 selects one according to agent queueing rules (e.g., first in first out), invokes logic to deliver the call (the FIG. 5 protocol), and terminates the routing process for this call. Otherwise event handler 52 returns control to routing interpreter 54 to determine the next step (hold 15 seconds). Event handler 52 then executes this step by setting a timer for 15 seconds. If an agent frees up during this 15 second period, the event is reported to the event handler 52, which assigns the agent to one of the waiting calls according to priority. If no agent becomes available for this call, at the expiration of the 15 second time, event handler 52 returns control to routing interpreter 54 for selection of the next step (add agent pool 2). Assuming no agent is immediately available, control is returned to the routing interpreter 54 to determine the succeeding step (hold 10). This is handled as above, with return of control to the routing interpreter 54 at the expiration of the 10 second time period to identify the next step (play message number 4, which has been arbitrarily numbered in FIG. 6). Event handler 52 plays the message indicated, allowing for interruption of the message and delivery of the call if an appropriate agent should come free. At the end of the message, event handler 52 again returns control to routing interpreter 54 for selection of the next step (add agent pool 3). The hold 5 seconds, play 10 seconds, and hold 10 seconds events are handled as above. After the second hold 10 seconds, routing interpreter 54 sees the hold 5 seconds as the next event, due to the loopback in the logic. The call routing process terminates when an agent becomes ready for assignment to the call in any of the pools being searched. When that occurs, event handler 52 delivers the call and terminates the routing process.

Referring to FIG. 5, having selected an agent station to receive the incoming call, call router 18 sends a call pending X.25 message to that agent station to alert it that it will be receiving a call. Call router 18 then initiates a call to that agent station, resulting in an associated setup call reference CR=2 at its ISDN interface 16 and a setup call reference CR=3 for the connection to the agent station at the agent station's interface 16. Network 14 provides a call proceeding acknowledgment for CR=2 for call router 18, and the agent station provides an optional call proceeding acknowledgment for CR=3 to network 14. (Items in brackets on FIG. 5 are optional.) When the agent station line is ringing, there also is an alerting CR=3 message provided to network 14, and this in turn triggers an alerting CR=2 message to call router 18 to inform call router 18 that the connection on CR=2 is now ringing. When the agent answers, there is a connect CR=3 message provided to network 14 and an acknowledgment by the network to the agent station that it has received the connect message. (If the agent does not answer, the condition will be reported as an alarm, and the next available agent will be selected.) Network 14 then provides a connect message to call router 18 to inform it that the agent has answered, and call router 18 provides a connect acknowledgment to the network. (This connection is indicated by "2" on FIG. 2.) Call router 18 puts the agent station on hold by a hold CR=2 message to the network, and the network acknowledges that message. Call router 18 then provides a transfer pending call X.25 message to the agent station to inform it that a call is being transferred to it. At this point, call router 18 connects to the incoming call at CR=1 by providing an alerting CR=1 message and a connect CR=1 message to the network. (This connection is indicated by "1" on FIG. 2.) The network provides a connect acknowledgment CR=1 message, and call router 18 then initiates the transfer function to tie the telephone connections at CR=1 and CR=2 to each other over the ISDN telephone network 14. (This connection is indicated by "3" on FIG. 2.) When this has been successfully carried out by the network, it provides a transfer acknowledge message to call router 18. Call router 18 then provides a transfer completed X.25 message to the agent station and receives an X.25 transfer received message from the agent station. If the agent station is an automated agent station, the automated agent may be activated to place it in a proper state, as indicated by the optional force transition (answer) message. Optionally, call router 18 can provide a tone or other indication to the agent station. This would require placing the caller on hold and reestablishing the connection to the agent until the transfer is effected. After the transfer has been completed, the network disconnects call router 18 from CR=1 and call router 18 releases the connection and receives an acknowledgment from the network. The network then similarly disconnects CR=2, and call router 18 releases CR=2 and receives a release complete message from the network.

The protocol of FIG. 5 is a method for automatically rerouting an incoming call from a first network station (call router 18) to a second network station (the chosen agent station) where the selection of the second network station takes place on a per-call basis. This protocol includes three important features.

First, the call pending (call #) message in the protocol provides pre-notification to the destination agent station of information as to the nature of the incoming telephone call before the call is actually delivered. This pre-notification may include information provided by call router 18 to condition acceptance or rejection of the call by the agent station. Specifically, pre-notification is used to validate the call for acceptance by the agent station, i.e., a caller description determined by call router 18 on the basis of CLID which could then be displayed at the agent station. Pre-notification may also be used to provide other ancillary call information to the agent station prior to call arrival.

Second, the FIG. 5 protocol provides for backward communication in the call rerouting procedure. In FIG. 5 there is a backward acknowledgment to the router's sending of the call pending message (which acts as an incoming call notification signal) through the communication of the alerting and connect messages (acting as response signals) from the destination agent station to call router 18. Since only router-directed messages can be received in the READY state, the alerting and connect messages announce to the router that the router's call has been accepted by the agent station. An explicit backward acknowledgment could also be provided to achieve the same goal. Use of backward communication from the agent station to call router 18 permits trying alternative destinations for the call. If the selected agent does not establish a connection in response to the setup message, the next available agent is selected as required. In general, call router 18 can select an alternative destination if the first selection fails. Moreover, ringing (and hence the initiation of telephone company charges) is delayed until an acceptable destination has been determined. Also the call can be rejected if an acceptable destination cannot be found, something that would probably have the most benefit in a non-ACD application. A further advantage of the backward acknowledgment is the ability to explicitly tag a call with an identity that has network-wide significance. If several calls are passed from call router 18 to the agent station, then the backward acknowledgments will assure that call identities assigned by call router 18 are preserved by the agent station. This feature is used to assure that all stages of a call can be tracked by call router 18 regardless of the number of agents or VRU's involved in its handling. Finally, the backward acknowledgment procedure provides the opportunity for explicit indication of connection establishment, since a tone can be placed on the line to the caller or agent which will disappear with the act of transfer.

Third, the FIG. 5 protocol allows for network call redirection to be based on any information obtainable about the call. This includes the calling line identity or any tone responses to prompts.

Automated attendants 38, 40 can be used to obtain additional information that is used by call router 18 in determining which agent station should receive an incoming call. When call router 18 receives a CLID or other identifying information for the incoming call, that information can be used to call up the customer's records from external host processor 34 and provide them to the agent station as required. Information entered by an agent during a call and during a WRAPUP state is transmitted to external host processor 34 for recording. The interface to external host processor 34 allows ACD system 10 to interwork with other data processing systems specific to the ACD business (e.g., billing or inventory). Examples of such interfaces are described in Switch-Computer Applications Interface Working Document, ANSI Standards Group T1S1.1, Document T1S1.1 89-231, and Emil Wang, "Intelligent Call Processing in Automatic Call Distributors", Business Communications Review, January-February, 1988 and embodied in the following products: Call Path (IBM), Adjunct-Switch Application Interface (AT&T ISDN/DMI User's Group), and Computer Integrated Telephony (DEC).

Figure 7B:
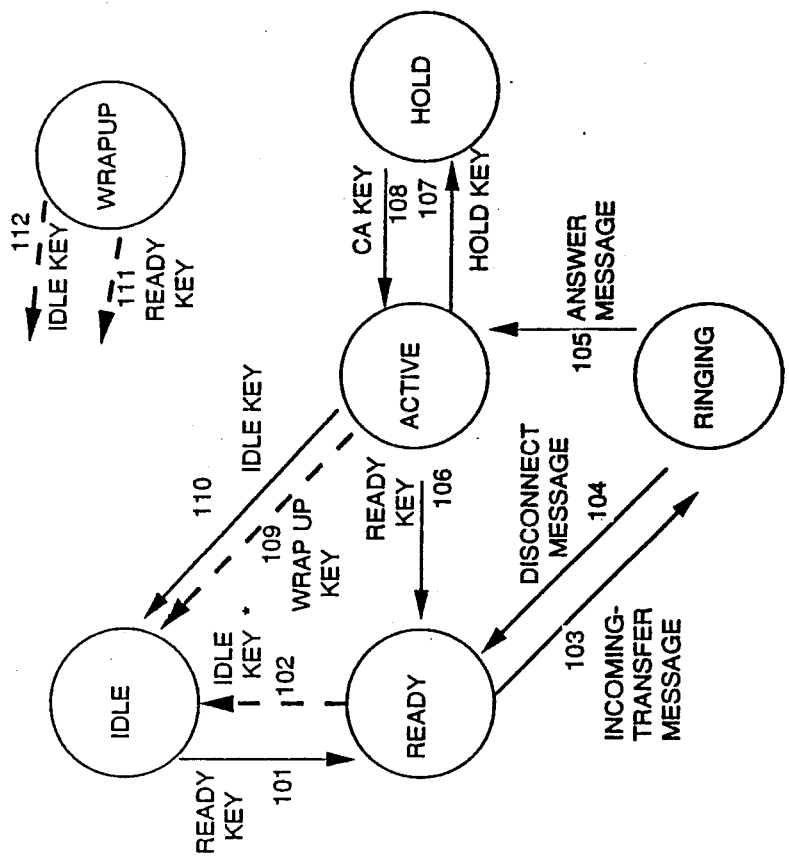
FIGS. 7A & 7B are diagrams of agent states illustrating modifying transitions between states.
Figure 7A:
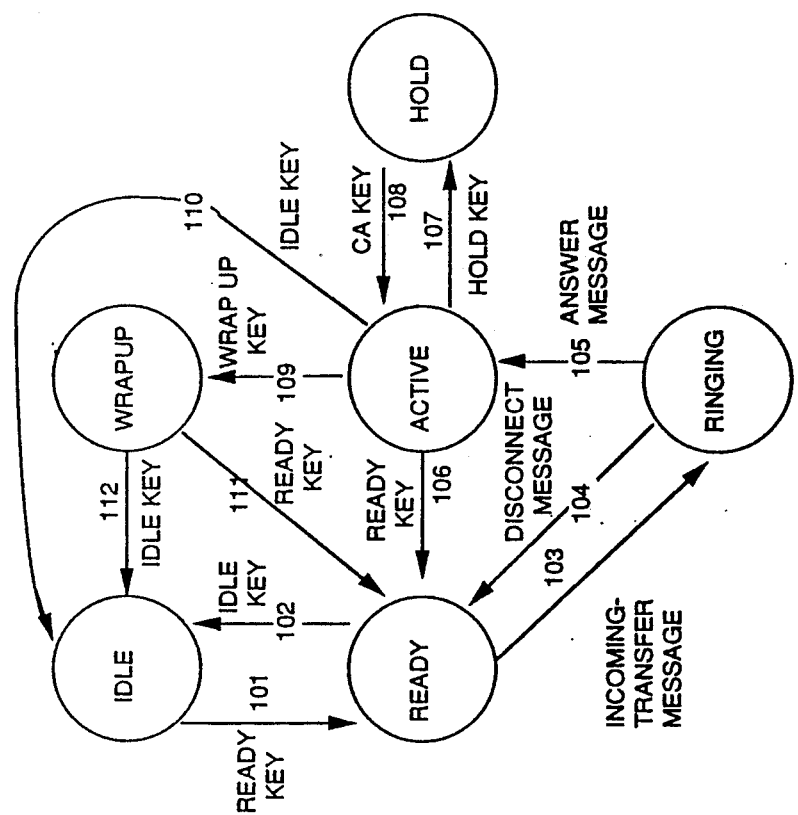

FIGS. 7A and 7B show partial state diagrams illustrating procedures for synchronization and customization of agent state transitions as seen by call router 18 and an agent station. The same basic method is used both for state synchronization and user customization of the state transition diagram. In the latter case the objective is to allow states to be bypassed, or transitions added or dropped, to accommodate the requirements of particular ACD applications.

FIG. 7A is a portion of the full agent state diagram (FIG. 4) considering only signed-on telephony states, without the ability to make outgoing calls, and without transfer functionality. Transition number 102, from the READY state to the IDLE state, should be synchronized between the agent station and call router 18. Otherwise, a new call could be directed by call router 18 to the agent station (via transition 103) at the same time the agent station is making the transition to idle. Therefore transitions 102 and 103 need to be synchronized with each other.

The method used for the agent station to synchronize transitions with call router 18 is for the agent station to request transitions, and wait for them to be granted by call router 18. The request is done by sending a transition request message from the agent station to call router 18, and the grant is done by sending a forced response signal message from call router 18 to the agent station. While waiting, the agent station is effectively in an intermediate state, in which all additional agent keystrokes are ignored.

A synchronized state transition for transition number 102 has the following message sequence. When the agent presses the idle key from the READY state, a transition request message is sent to call router 18, which responds with a forced IDLE response signal message in the event that no call is pending for the agent. Otherwise the agent remains in READY until the arrival of the call.

It would be possible for all state transitions to use this protocol. However, better performance can be gained by letting the majority of transitions be unsynchronized, with the agent simply executing the state transition and notifying call router 18 of its status by sending a transition notification message. On FIG. 7b, the transitions involving a transition request are indicated by dashed lines, and the transitions involving transition notifications are indicated by solid lines. The agent station maintains a transition table giving the appropriate transition type for each state transition. This may be done in practice with a two-bit field for each transition, where the allowed transition types are request, notify, ignore, or error (not allowed).

In order to use this synchronization protocol to customize the state diagram, one need only modify the transition table in the agent station and allow call router 18 to use the forced response signal message to return a different state than the one requested. Call router 18 maintains a response table that lists the appropriate forced response signal message to be used in responding to each synchronized transition request. FIG. 7B illustrates the case where the FIG. 7A agent state diagram has been modified to prevent use of (effectively delete) the WRAPUP state. To achieve this, transition 109 is changed to a synchronized transition, and transitions 110 and 111 become errors in the transition table at the agent stations. In the response table in call router 18, transition 109 is redirected to the IDLE state, so that an agent pressing the WRAPUP key is forced into the IDLE state.

The method can also be used to support customized state diagrams on a per application basis. In this case the transition table and a response table are developed for each application, and an application field is added to the transition messages. Once the call application is determined by call router 18, it is communicated to the agent by X.25 message (e.g., call pending). The agent station uses the application to find the relevant portion of the transition table, and includes the application in each transition request message, so that call router 18 need not look it up. The response table similarly determines the appropriate forced response signal message (by application) for each synchronized transition request.

Another use for customized state diagrams is in response to system load conditions. For example, the system may reduce the number of agent states required for call handling if many callers are already waiting for service. This could be used if the WRAPUP state were normally used to enter descriptive but non-essential information about a customer transaction, and the system would eliminate the WRAPUP state whenever the number of customers in queue exceeded a user-specified threshold (either overall or per-application). The change from a normal state diagram to an exceptional state diagram could also be invoked on a per-call basis if a call's waiting time exceeded a threshold. The above-described method can implement this feature by treating normal and exceptional state diagrams as distinct applications.

Other Embodiments

Other embodiments of the invention are within the scope of the following claims.

For example, besides the ISDN interface, other network service interfaces can work so long as they have the following capabilities: call arrival signalling, control of call routing by the call router, interconnection of the caller and agent station, and communication of control messages from the call router to agent stations and of status messages generated at agent stations to the call router. These are purely connection establishment and control capabilities. Because the router communicates with the agent stations, the network interface does not provide any specialized function (such as agent monitoring) related to the operation of the ACD. Hence this invention requires only the ordinary communication capabilities of a network service interface. The broadband ISDN interface (being developed in international and domestic U.S. standard bodies, CCITT recommendation I.121) may also be used when available. The interface to call router 18 could employ common channel signaling (CCS) associated with "800" service, e.g., as described in G. G. Schlanger, "An Overview of Signaling System No. 7", IEEE Journal on Selected Areas in Communications, Volume SAC-4, Number 3, May, 1986. The CCS interface could be used by call router 18 to control routing of calls to agents where the agent to router communication is still implemented by ISDN and X.25. Specifically, the network could notify call router 18 of a call attempt before a call is actually delivered to call router 18, and call router 18 could then instruct the network to send the call to the destination chosen by the router. In addition to the CCS interface, call router 18 could use an X.25 interface for monitoring of agents.

In addition to communication over a public telephone network, private networks or combinations of networks can also be used. Examples include a PBX or virtual private network (i.e., a network that is provided by the telephone company but appears to the user to be a private network) employing ISDN, or any local/metropolitan/wide area network (e.g., as standardized in the IEEE 802 committees) with the above-listed connection control capabilities provided at the network layer.

In an ISDN network, instead of having all communication between the call router and agent station via X.25 messages, some of the communication could be by user-to-user signalling service as being standardized by standards group T1S1and documented in T1S1.1 89-144 Apr. 25, 1989.

The agent stations can have different states than those shown in FIG. 4; what is important for practice of the invention is that the agent station perform a function on behalf of the overall system under the control of the call router.

Multiple call routers 18 and agent supervisor stations 42 may be used in large system configurations, and supervisor station functions may be combined with agent station functions if a supervisor is to act as an agent in periods of high system load.

The different call router functions may be split up and placed at different locations on the network; e.g., one portion of the call router may be implemented at a separate agent monitoring station that receives the agent status messages, monitors the agent states, and communicates with the agent stations and the remaining portions of the call router via the network and network services interfaces.

Incoming calls to agent stations (instead of always being blocked) may be screened by call router 18 for subsequent handling. Specifically, the agent station may inform call router 18 of a call arrival coming directly to the agent station by an X.25 message to call router 18 for processing. Call router 18 could then decide whether to accept or reject the call, or whether to transfer the call to another agent station selected by the routing logic. The arrival of the call would not necessarily be visible to the agent at the agent station. This arrangement allows for incoming calls to the ACD to be received at different locations for different callers.

Features of the invention also may be applied in non-telephone environments. Instead of routing telephone calls to agents, the system could automatically establish a communication connection between a service requesting station and one of a plurality of agent service providing stations with application-specific agent states. For example, an application station may be capable of running programs concerned with various aspects of the user's business, and a connection request could be assigned to an available station running a program or accessing a data file corresponding to the requested service. This would mean that incoming connection requests or internal connection requests could be directed to the stations best prepared to handle the transactions. The application stations may still be operated by human or mechanized means.

An example application could be defined by software development within a Computer Aided Software Engineering (CASE) environment (e.g., development systems available from DEC, IBM or Hewlett-Packard). Agent states could be determined by active CASE tool processes, data files in use, and active connections. A call router 18 with knowledge of agent application states would automatically direct internal or external requests for information or software support to agents currently performing related work. Additional automated agents would be represented by centralized development resources.

Also in these non-ACD environments, network service interfaces other than ISDN, PRI and BRI interfaces can work so long as they have the capabilities of call arrival signalling, control of call routing by the call router, interconnection of the caller and agent station, and communication between the agent station and call router. For example, the B-ISDN network service interface could control connections involving transmission of digital data signals or transmission of image or video signals. Also, the network could be an X.25 data network with call redirection or deflection capabilities, a local area network, or a wide area network. The system would have a receiving means that receives agent state messages and service request messages from the network, and would also have routing means that generates a routing signal that is provided to the network to connect the service requesting station via a communication connection to the agent application station.

What is claimed is:

1. An automatic call distributing system for automatically distributing telephone calls placed over a network to one of a plurality of agent stations connected to said network via network service interfaces and providing agent status messages to said network, said system comprising
    receiving means connected via a network service interface to said network for receiving said agent status messages and call arrival messages from said network indicating that incoming calls have been made on said network, said agent status messages being generated at said agent stations and communicated through said network service interfaces and network to said receiving means, and
    routing means responsive to said receiving means for generating a routing signal provided to the network to cause said network to establish a connection directly between said incoming call and an agent station through the network so that said connection is external of said routing means.

2. The system of claim 1 wherein said routing signal is based on characteristics of said agent stations so as to connect said incoming call to an appropriate agent station.

3. The system of claim 1 wherein said network is a public telephone network.

4. The system of claim 1 wherein said network is a private telephone network.

5. The system of claim 3 or 4 wherein said receiving means is adapted to be connected to said network via an ISDN interface.

6. The system of claim 3 wherein said receiving means is adapted to be connected to said network via a CCS interface.

7. The system of claim 6 wherein said CCS interface is used for said call arrival messages and said routing signal, and a packet switched data interface is used for said agent status messages.

8. The system of claim 1 wherein said receiving means and said routing means are implemented on a personal computer or a workstation.

9. The system of claim 1 wherein said receiving means and said routing means are implemented on a mainframe or a minicomputer.

10. The system of claim 2 wherein said characteristics are communicated to said routing means via said agent status messages.

11. The system of claim 2 wherein said routing signal is based on the capabilities, identities or locations of agents at said agent stations.

12. The system of claim 11 wherein said routing means is adapted to receive an identification signal identifying agents at agent stations on sign on.

13. The system of claim 10 wherein said routing signal is based on agent status messages indicating states of said agent stations.

14. The system of claim 1 wherein said routing signal is based on the characteristics of the incoming call.

15. The system of claim 14 wherein said routing signal is based on the dialed or dialing number of the incoming call.

16. The system of claim 2 wherein said routing signal is based on the cost of delivery of the incoming call to the agent station.

17. The system of claim 1 wherein said routing means includes programmable means for selecting an agent station to receive said incoming call.

18. The system of claim 10 wherein said status messages are transmitted according to the X.25 standard.

19. The system of claim 3 or 4 wherein said routing signal is a signal that causes said network to establish a telephone connection from said routing means to said agent station and to thereafter have the network connect the incoming call and the telephone connection to the agent station.

20. The system of claim 1 further comprising a plurality of said agent stations.

21. The system of claim 20 wherein a said agent station is implemented by a personal computer or workstation.

22. The system of claim 21 wherein said personal computer or workstation has a display device with windows displaying and invoking the functions of agent station control and work carried out by an agent at said agent station.

23. The system of claim 20 wherein said agent station provides the dedicated function of control of communication via a said network service interface, and said station has the capabilities to establish connections on behalf of an external terminal.

24. The system of claim 20 wherein said agent stations include means to provide said agent status messages over said network to said routing means, and said routing signal provided by said routing means is based upon the agent states indicated in said agent status messages.

25. The system of claim 24 wherein said agent stations have a plurality of agent states associated with a sign-off condition in which the agent stations do not transmit said agent status messages to said routing means and a plurality of states associated with a sign-on condition during which said agent stations provide said agent status messages to said routing means.

26. The system of claim 25 wherein said agent stations have means to receive and initiate calls in the sign-off condition and can initiate calls in the sign-on condition.

27. The system of claim 25 wherein a said agent station comprises means for initiating outgoing calls by a call initiation signal to said routing means, and wherein said routing means comprises means for selecting a destination telephone in response to said call initiation signal.

28. The system of claim 27 wherein said routing means comprises means for generating a routing signal provided to the network to connect said agent station initiating an outgoing call to said destination telephone through the network.

29. The system of claim 25 wherein said agent stations have means to prevent the agent station from receiving calls when in said signed-on condition unless they have been routed by said routing means.

30. The system of claim 24 wherein said agent stations have means to cause the contents of a said call arrival message to be sent to said receiving means when an incoming call has been directed to said agent station by the network without routing by said routing means.

31. The system of claim 25 wherein one of the states in said sign-on condition of said agent station is the ready state, and said routing signal will only direct an incoming call to an agent station that is in the ready state.

32. The system of claim 25 wherein one of the states in the sign-on condition is the hold state in which one or more calls can be placed on hold while the agent actively engages in another call.

33. The system of claim 20 further comprising an automated agent at said agent station.

34. The system of claim 20 further comprising an interactive display terminal for interacting with a human agent.

35. The system of claim 1 further comprising an automated attendant or a voice response unit connected to said network to communicate with an incoming call.

36. The system of claim 35 wherein said automated attendant or voice response unit is connected by said routing means to communicate with a said incoming call prior to providing a routing signal by said routing means.

37. The system of claim 35 wherein said automated attendant or voice response unit is connected to said routing means over said network via a network service interface.

38. The system of claim 35 wherein said automated attendant or said voice response unit is directly connected to said routing means.

39. The system of claim 1 further comprising an external host processor containing information as to the business supported by said automatic call distributing system, said external host processor being connected to provide information to and to receive information from said system.

40. The system of claim 39 wherein said external host processor is connected to communicate with said agent stations over said network.

41. The system of claim 39 wherein said routing means receives a customer identification as to the incoming call and said external host processor provides customer information to the agent station selected by the routing means to receive the call.

42. The system of claim 1 further comprising a system manager station connected to receive system information as to the operation of said automatic call distributing system from said routing means and to provide control signals to said routing means, said system manager station including an interactive display for displaying said system information and receiving inputs to generate said control signals, said control signals including signals for programming the generating of said routing signal by said routing means.

43. The system of claim 1 further comprising an agent supervisor station connected to receive agent performance information about the performance of agents at said agent stations from said routing means and to provide control signals to said routing means, said agent supervisor station including an interactive display for displaying said agent performance information and for receiving inputs to generate said control signals, said control signals relating to support of supervised agent activities.

44. The system of claim 42 or 43 wherein said system manager station or said agent supervisor station is directly connected to said routing means.

45. The system of claim 42 or 43 wherein a personal computer or workstation implements said receiving means and said routing means, and said system manager station or said agent supervisor station is implemented on the same personal computer or workstation.

46. The system of claim 42 or 43 wherein said system manager station or said agent supervisor station is remote from said routing means and is connected to it via a network service interface over said network.

47. The system of claim 1 wherein said network provides transmission of any of digital data, voice, image or video signals of incoming calls to said agent stations.

48. The system of claim 4 wherein said private telephone network is a PBX.

49. A system for automatically establishing over a network a communication connection between a service requesting station and one of a plurality of agent service providing stations connected to said network via network service interfaces and providing agent status messages to said network, said system comprising
receiving means connected via a network service interface to said network for receiving said agent status messages and a service request message from said network indicating that an incoming service request has been made by a service requesting station on said network, said agent status messages being generated at said agent stations and communicated through said network service interfaces and network to said receiving means, and
routing means responsive to said receiving means for generating a routing signal provided to the network to cause said network to establish a connection directly between said incoming service request and an agent service providing station through the network so that said connection is external of said routing means.

50. The system of claim 49 wherein said routing signal is based on said status signals so as to connect said incoming service request to an appropriate agent service providing station.

51. The system of claim 49 wherein said network is an X.25 network.

52. The system of claim 50 wherein said network is a local area network or a wide area network.

53. The system of claim 49 wherein said communication involves transmission of digital data signals.

54. The system of claim 49 wherein said communication involves transmission of voice, image or video signals.

55. The system of claim 49 further comprising a plurality of said agent service providing stations.

56. The system of claim 55 wherein said agent service providing stations include means to provide said agent status messages over said network to said routing means, and said routing signal provided by said routing means is based upon the agent states indicated in said agent status messages.

57. The system of claim 39 wherein said external processor sends agent selection information to the routing means, and said routing signal is based on said agent selection information.

58. The method of claim 1 or 49 wherein said receiving means has portions located at two different locations, said receiving means including a first means connected via a network services interface for receiving said agent status messages and a second means connected via a network services interface for receiving said call arrival messages from said network.

59. The system of claim 49 wherein said system is a telecommunications system, and said service requesting station is a telephone station.

60. The system of claim 49 wherein said receiving means is adapted to be connected to said network via an ISDN interface.

61. The system of claim 54 wherein said communication involves transmission of voice.

62. The system of claim 54 wherein said communication involves transmission of image.

63. The system of claim 54 wherein said communication involves transmission of video signals.

* * * * *

UNITED STATES PATENT AND TRADEMARK OFFICE
CERTIFICATE OF CORRECTION

PATENT NO.   : 5,036,535
DATED        : July 30, 1991
INVENTOR(S)  : Jerry Gechter, Jeffrey A. Fried, Robert L. Pokress, and G. Wayne Andrews It is certified that error appears in the above-identified patent and that said Letters Patent are hereby corrected as shown below:

ON THE TITLE PAGE:

In Section [75], "Inventors":
    Line 3: after "Mass." insert --; G. Wayne Andrews, Nashua, N.H.--.

In "Other Publications":
    Fifth line: change "Telecomunications" to --Telecommunications--.

Col. 2, line 37: change "to0receive" to --to receive--;
    Col. 3, lines 45-46: after "condition" insert a paragraph break so that "In another aspect" begins a new paragraph;
    Col. 9, line 9: change "give" to --given--.

Signed and Sealed this

Fourth Day of May, 1993

Attest:

MICHAEL K. KIRK

*Attesting Officer*   Acting Commissioner of Patents and Trademarks